US012423958B2

(12) United States Patent
Liu et al.

(10) Patent No.: US 12,423,958 B2
(45) Date of Patent: Sep. 23, 2025

(54) METHOD FOR GENERATING TRAINING DATA ON BASIS OF DEFORMABLE GAUSSIAN KERNEL IN POPULATION COUNTING SYSTEM

(71) Applicant: CRSC COMMUNICATION & INFORMATION GROUP COMPANY LTD., Beijing (CN)

(72) Inventors: Yang Liu, Beijing (CN); Guodong Ni, Beijing (CN); Weiming Hu, Beijing (CN); Bing Li, Beijing (CN); Zhizhong Shen, Beijing (CN); Xiangbin Kong, Beijing (CN)

(73) Assignee: CRSC COMMUNICATION & INFORMATION GROUP COMPANY LTD., Beijing (CN)

( * ) Notice: Subject to any disclaimer, the term of this patent is extended or adjusted under 35 U.S.C. 154(b) by 1001 days.

(21) Appl. No.: 17/607,236

(22) PCT Filed: Apr. 24, 2020

(86) PCT No.: PCT/CN2020/086534
§ 371 (c)(1),
(2) Date: Oct. 28, 2021

(87) PCT Pub. No.: WO2021/093276
PCT Pub. Date: May 20, 2021

(65) Prior Publication Data
US 2022/0222930 A1     Jul. 14, 2022

(30) Foreign Application Priority Data
Nov. 12, 2019   (CN) .......................... 201911098587.3

(51) Int. Cl.
*G06V 10/774*     (2022.01)
*G06F 18/214*     (2023.01)
(Continued)

(52) U.S. Cl.
CPC .......... *G06V 10/7747* (2022.01); *G06N 3/02* (2013.01); *G06F 18/214* (2023.01); *G06N 3/045* (2023.01);
(Continued)

(58) Field of Classification Search
CPC .. G06V 10/7747; G06V 10/774; G06V 20/53; G06V 10/245; G06N 3/02; G06N 3/045; G06F 18/214
See application file for complete search history.

(56) References Cited

U.S. PATENT DOCUMENTS

2020/0364567 A1* 11/2020 Oh ........................ G06N 3/045

FOREIGN PATENT DOCUMENTS

CN         107301387 A        10/2017

OTHER PUBLICATIONS

Sang et al.,( NPL "Improved Crowd Counting Method Based on Scale-Adaptive Convolutional Neural Network" Published Jan. 1, 2019 (2 pages) (Year: 2019).*

(Continued)

*Primary Examiner* — Quoc A Tran
(74) *Attorney, Agent, or Firm* — HAUPTMAN HAM, LLP

(57) ABSTRACT

Disclosed is a method for generating training data based on a deformable Gaussian kernel in a crowd counting system, which includes steps of: finding a set of overlapping Gaussian kernels from training data; stretching an occluded Gaussian kernel; rotating the occluded Gaussian kernel; adjusting a center point coordinate of the occluded Gaussian kernel; and determining whether there is any Gaussian kernel that have not been selected yet in the training data, and outputting a resulted crowd density map having gray values as training data. Therefore, feature similarity between the crowd density map in the training data and an actual picture (Continued)

is effectively increased so that a regular pattern between the training data and the actual picture can be more readily learned by a convolutional neural network and an accuracy of the crowd counting system is improved.

10 Claims, 2 Drawing Sheets

(51) Int. Cl.
    *G06N 3/02*     (2006.01)
    *G06N 3/045*     (2023.01)
    *G06V 10/24*     (2022.01)
    *G06V 20/52*     (2022.01)

(52) U.S. Cl.
    CPC .......... *G06V 10/245* (2022.01); *G06V 10/774* (2022.01); *G06V 20/53* (2022.01)

(56) References Cited

OTHER PUBLICATIONS

International Search Report in corresponding International Application No. PCT/CN2020/086534, mailed Aug. 10, 2020; 8 pgs.

\* cited by examiner

METHOD FOR GENERATING TRAINING DATA ON BASIS OF DEFORMABLE GAUSSIAN KERNEL IN POPULATION COUNTING SYSTEM

RELATED APPLICATIONS

The present application is a U.S. National Phase of International Application Number PCT/CN2020/086534 filed Apr. 24, 2020, and claims priority to Chinese Application Number 201911098587.3 filed Nov. 12, 2019.

FIELD OF THE INVENTION

The present disclosure relates to a field of pattern recognition, in particular to a method for generating training data based on a deformable Gaussian kernel in a crowd counting system that is applied on computer vision technology.

BACKGROUND OF THE INVENTION

In recent years, a basic approach commonly used in crowd behavior analysis is a crowd counting system based on deep learning of a convolutional neural network. The main principle of the system is automatic learning of key characteristics of human head (such as approximately circular shape, darker hair relative to the background etc.) by the convolutional neural network through a lot of training, and difference comparison at last between a convolution map output by the convolutional neural network and a pre-made crowd density map which uses a human head shape-like two-dimensional Gaussian kernel density function (hereinafter referred to as a Gaussian kernel) to indicate a location of the head of an individual. Because an integral of values at every pixels of a single Gaussian kernel in the crowd density map is 1, the system can thereby obtain an estimated number of the total number of people in an original picture by merely statistically outputting a sum of integrals of values at all pixels belonging to respective Gaussian kernels in the crowd density map. The system uses the estimated number of the total number of people, an actual number in training data and a difference between the convolution map output by the network and the crowd density map in the training data as reference for reverse error propagation of the convolutional neural network, and then modifies relevant parameters in the network through iterations so as to train ability of identification of human head shaped targets by the convolutional neural network.

In view of a fact that most of existing crowd counting databases provide only two-dimensional coordinates of human heads in a picture as training data (i.e., a target to be completed by a training algorithm), the system needs to transform a two-dimensional coordinate of each human head in the training data into a head-like shape in the picture so that the system is facilitated to perform error comparison between an output crowd density map and the training data so as to optimize a training effect of the convolutional neural network. Therefore, training data generation methods in the crowd counting systems all apply a two-dimensional Gaussian kernel density function, and use a coordinate of a position of each head as a center point to generate a simulated head-shape in the picture for training so as to achieve a better training effect.

As mentioned above, during generation of training data of a crowd counting system, one of the most critical step is to use a two-dimensional coordinate of a human head as a center point to generate a corresponding Gaussian kernel. A specific method for generating a Gaussian kernel is explained by, first, giving a formula expression of a continuous two-dimensional Gaussian function as below:

$$g(x, y) = f(x)f(y) = \frac{1}{2\pi\sigma_x\sigma_y} \exp\left(-\left(\frac{(x-x_0)^2}{2\sigma_x^2} + \frac{(y-y_0)^2}{2\sigma_y^2}\right)\right) \quad (1)$$

Where $(x_0, y_0)$ is a position of a center point of the function, i.e., a coordinate of a human head. $\sigma_x$ and $\sigma_y$ are variances of the function with respect to a direction of the x-axis and a direction of the y-axis, respectively. Considering that a human head may generally be regarded as a circle, $\sigma_x = \sigma_y$ is taken by default in above cited documents to facilitate calculation.

Thus, in a discrete domain, discrete Gaussian kernels of a scale of $(2k+1)*(2k+1)$ may be expressed as:

$$H(i, j) = A \cdot \exp\left(-\left(\frac{(i-k-1)^2}{2\sigma_i^2} + \frac{(j-k-1)^2}{2\sigma_j^2}\right)\right) \quad (2)$$

Where A is a constant that is set to render an integral of Gaussian kernel gray values of respective pixels within a cut-off area of a Gaussian kernel to equals to 1, and a value of the constant is not necessarily equal to a value of the term $$\frac{1}{2\pi\sigma_x\sigma_y}$$

in Formula 1, but needs to be adjusted in view of a practical case so that a sum of the gray values of the respective discrete pixels belonging to the Gaussian kernel that corresponds to one same human head head is of 1. Therefore, a calculation approach of A is as below:

$$A = 1 \Big/ \sum_{(i,j) \in head} \exp\left(-\left(\frac{(i-k-1)^2}{2\sigma_i^2} + \frac{(j-k-1)^2}{2\sigma_j^2}\right)\right) \quad (3)$$

Formula 3 is called an expression of discrete Gaussian kernel of the traditional crowd counting system. The system repeats the above process with respect to coordinates of every heads in the training data, and then draws the gray values of the discrete pixels of all the Gaussian kernels in the same picture in a superimposed manner. In this way, generation of the training data is completed.

However, in reality, there is a phenomenon in a large number of crowd pictures, that is, human heads overlap one another due to mutual occlusion. According to a principle of perspective relationship, the closer the center points of two occluded heads approach with each other in a direction of camera's view angle, the larger a proportion of an overlapping area therebetween there is.

According to the existing method, these two overlapping heads are represented by their own uniformly circular Gaussian kernels, respectively. A head at a front position in the original crowd picture has relatively complete and clear round edge that is very similar to the shape of the circular Gaussian kernel in the training data so that the convolutional neural network can easily recognize the head by learning the training data. Rather, an occluded head in the rear shows a crescent shape to some extent in terms of a degree that it is occluded, and a visual center of gravity of the occluded head moves to a non-overlapped part. In the case of that the circular Gaussian kernel is continued to be adopted, according to the nature of the Gaussian kernel, the closer a location approaches to the center of a circle, the larger its gray value is, and visual centers of gravities of these two overlapping circular Gaussian kernels are both near to a line connecting center points of these Gaussian kernels. As a result, a visual center of gravity of the occluded head in the original picture would not only be inconsistent with a visual center of gravity of the corresponding occluded Gaussian kernel in the crowd density map of the training data, but also be easily to be merged as a whole into a Gaussian kernel corresponding to a head that occludes it. Therefore, it is hard for the convolutional neural network of the crowd counting system to learn, through training Gaussian kernels of circular, a feature pattern of the occluded head and separate the occluded head from the front head that occludes it, as a result of which a poor training effect is resulted ultimately, the crowd density map output by the system is inaccurate, and an error of crowd counting is considerably large.

SUMMARY OF THE DISCLOSURE

In view of the above problem, the present disclosure aims to provide a method for generating training data based on a deformable Gaussian kernel in a crowd counting system, which effectively increases feature similarity between a crowd density map in training data and an actual picture so that a regular pattern between the training data and the actual picture can be more readily learned by a convolutional neural network and an accuracy of the crowd counting system is improved.

In order to achieve the above objective, the present disclosure implements a technical process as following. A method for generating training data based on a deformable Gaussian kernel in a crowd counting system includes steps of: 1) finding a set of overlapping Gaussian kernels from training data; 2) stretching an occluded Gaussian kernel; 3) rotating the occluded Gaussian kernel; 4) adjusting a center point coordinate of the occluded Gaussian kernel; and 5) determining whether there is any Gaussian kernel that have not been selected yet in the training data, and outputting a resulted crowd density map having gray values as training data.

Further, in the step 1), center point coordinates of every Gaussian kernels in the training data generated through Gaussian kernels of a traditional crowd counting system are read in a sequential order, and a read Gaussian kernel is recorded as a Gaussian kernel that has been selected, and a center point coordinate of another Gaussian kernel that is mostly close to the selected one is found; if a geometric distance between their center point coordinates is less than a sum of the irrespective variances, then it is considered that these two Gaussian kernels in the training data have an overlap occurred between their corresponding heads in an original picture, that is, these two Gaussian kernels overlap one another.

Further, for each Gaussian kernel, only another one that has the shortest geometric distance from the one's own center point coordinate is involved into a judgment as to whether there is an overlap therebetween, if it is judged that they have positively overlapped one another, they two are regarded as Gaussian kernels that have been selected, and then proceed to the step 2); otherwise, proceed to the step 5).

Further, in the step 2), for Gaussian kernels a and b that are judged to be overlapping one another, if a variance of one of the Gaussian kernels a is greater than a variance of the other Gaussian kernel b, then it is considered that a head corresponding to a has a shorter straight distance from a camera taking a crowd picture, and it is the a who occludes the b in the picture.

Further, the Gaussian kernel b is stretched along directions of coordinate axes: the variance of the Gaussian kernel b is decomposed into two independent variance components $\sigma_{b\_x}$ and $\sigma_{b\_y}$ along ax-axis and ay-axis, respectively, and a direction of the x-axis is taken as a direction of a line connecting the center point coordinates of the Gaussian kernels a and b by default; according to the following formulas, the variance component of the occluded Gaussian kernel b along the x-axis is to be decreased, and the variance component of the Gaussian kernel b along the y-axis is kept unchanged:

$$\sigma_{b\_x}^* = \sigma_{b\_x} \cdot \left( \frac{1}{2} + \frac{\sqrt{(x_{0\_b} - x_{0\_a})^2 + (y_{0\_b} - y_{0\_a})^2}}{2(\sigma_a + \sigma_b)} \right) \quad (5)$$

$$\sigma_{b\_y}^* = \sigma_{b\_y} \quad (6)$$

The variances of the stretched Gaussian kernel b are substituted into an expression of discrete Gaussian kernel of a traditional crowd counting system, and thereby an expression of stretched discrete Gaussian kernel is obtained.

Further, in the step 3), it is assumed that there is an counterclockwise angle difference θ between the positive x-axis of the crowd density map and one end of the line connecting the center points of the Gaussian kernels a and b which faces toward the b, then the Gaussian kernel b is required to rotate counterclockwise by an angle θ with its own center point as the origin; a coordinate (x, y) of a point belonging to the crowd density map is transformed according to a coordinate transformation rule that the plane rectangular coordinate system being rotated counterclockwise by the angle θ so that a coordinate (x*, y*) of the point relative to a rotation-past coordinate system of the occluded Gaussian kernel b is obtained; the coordinate of this point relative to the rotation-past coordinate system of the occluded Gaussian kernel b is substituted into the expression of stretched discrete Gaussian kernel to obtain an expression of rotation-past stretched discrete Gaussian kernel.

Further, the coordinate (x*, y*) is that, $$x^* = x\cos\theta + y\sin\theta \quad (7)$$
$$= x \frac{x_{0\_b} - x_{0\_a}}{\sqrt{(x_{0\_b} - x_{0\_a})^2 + (y_{0\_b} - y_{0\_a})^2}} + y \frac{y_{0\_b} - y_{0\_a}}{\sqrt{(x_{0\_b} - x_{0\_a})^2 + (y_{0\_b} - y_{0\_a})^2}}$$

$$y^* = y\cos\theta - x\sin\theta \quad (8)$$
$$= y \frac{x_{0\_b} - x_{0\_a}}{\sqrt{(x_{0\_b} - x_{0\_a})^2 + (y_{0\_b} - y_{0\_a})^2}} - x \frac{y_{0\_b} - y_{0\_a}}{\sqrt{(x_{0\_b} - x_{0\_a})^2 + (y_{0\_b} - y_{0\_a})^2}}$$

Further, in the step 4), the center point coordinate of the Gaussian kernel b is moved, along the line connecting the center points of the Gaussian kernels a and b, toward an orientation of the Gaussian kernel b, a moving distance being equal to an amount $\sigma_{b\_x}-\sigma_{b\_x}^*$ by which the variance of the Gaussian kernel b decreases along the x-axis in the step 2).

Further, the adjusted center point coordinate $(x_{0\_b}^*, y_{0\_b}^*)$ of the Gaussian kernel b is that, $$x_{0\_b}^* = x_{0\_b} + (\sigma_{b\_x} - \sigma_{b\_x}^*)\cos\theta \qquad (9)$$

$$= x_{0\_b} + (\sigma_{b\_x} - \sigma_{b\_x}^*)\frac{x_{0\_b} - x_{0\_a}}{\sqrt{(x_{0\_b} - x_{0\_a})^2 + (y_{0\_b} - y_{0\_a})^2}}$$

$$y_{0\_b}^* = y_{0\_b} + (\sigma_{b\_x} - \sigma_{b\_x}^*)\sin\theta \qquad (10)$$

$$= y_{0\_b} + (\sigma_{b\_x} - \sigma_{b\_x}^*)\frac{y_{0\_b} - y_{0\_a}}{\sqrt{(x_{0\_b} - x_{0\_a})^2 + (y_{0\_b} - y_{0\_a})^2}}$$

Further, in the step 5), if there is any Gaussian kernel that has not been selected yet in the step 1) in the training data, then go back to the step 1); otherwise, with respect to respective pixels in the crowd density map, gray values of those pixels belonging to a Gaussian kernel are added together, and a resulted crowd density map having the gray values is output as training data, then the process ends.

By using these above, the present disclosure has the following advantages: 1. When a circular Gaussian kernel adopted in a traditional crowd counting system performs processes on an occluded human head, a visual center of gravity of an circular Gaussian kernel that is occluded is often inconsistent with a visual center of gravity of the occluded head in an actual picture, and also center points of the Gaussian kernels corresponding to those mutually overlapping heads are separated inadequately from one another. As a result, it is hard for a convolutional neural network of the crowd counting system to learn a feature pattern of the occluded head during training, which ultimately leads to a poor training effect as well as a considerable error of the crowd density map output by the system, and degrades an accuracy of crowd counting. As such, in the present disclosure, information contained in those known data has be fully excavated as a center point coordinate and a variance of a Gaussian kernel in the training data have been utilized to the greatest extent, and the occluded Gaussian kernel has gone through stretch, rotation, and center point coordinate adjustment so that feature similarity between the crowd density map of the training data and the actual picture is effectively increased, the convolutional neural network may be facilitated to learn a regular pattern between the training data and the actual picture, and an accuracy of the crowd counting system is improved. 2. That provided by the present disclosure may be directly nested in a Gaussian kernel generation method of a traditional crowd counting system and effectively share a convolutional neural network structure and input data with a traditional method, and thus nearly no modification is required to be conducted on main workflow of the original crowd counting system, which thereby costs a small amount of work. 3. In practical usage, for each Gaussian kernel, only another one that has the shortest distance from it can be involved into a judgment as to whether there is an overlap therebetween, and only if it is judged that they two have positively overlapped one another, can steps, such as stretch, rotation, and center point adjustment and the like be applied subsequently to the Gaussian kernel. As such, it is ensured that the Gaussian kernel of each head is deformed at most once, and algorithm complexity will not increase in an exponential manner along with increase of the number of Gaussian kernels in the training data. 4. The deformation steps of the Gaussian kernel follow rigorous mathematical principles to ensure that a value of an integral of a deformed Gaussian kernel is still of 1, that is, the deformed Gaussian kernels can still be adopted to calculate the number of their corresponding human heads. 5. All steps of the present disclosure are fully automated without either additional operation to be conducted by a user during the execution, or related data to be re-measured by the user, saving work labor, material resources and time costs.

DETAILED DESCRIPTION OF THE EMBODIMENTS

The present disclosure will be described in detail below with reference to the drawings and embodiments.

Figure 1:
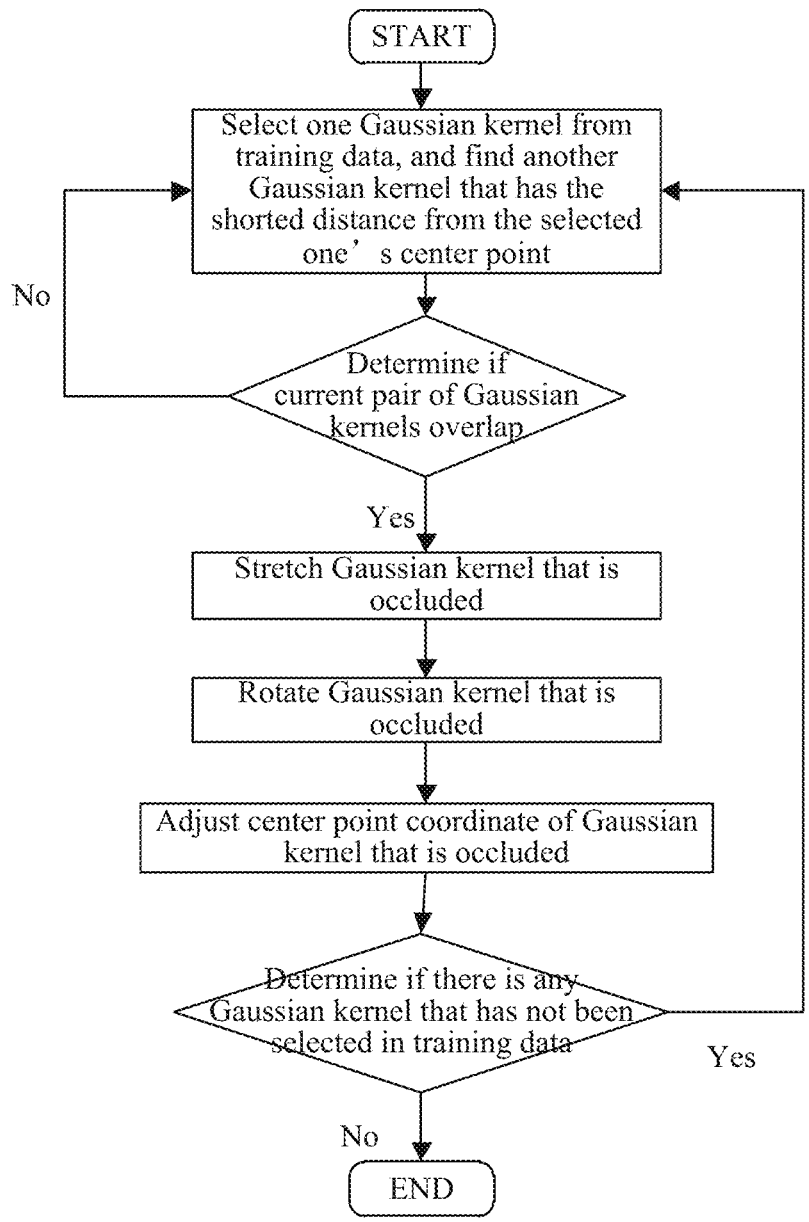
FIG. 1 is a schematically overall flow chart of the present disclosure.

As shown in FIG. 1, the present disclosure provides a method for generating training data based on a deformable Gaussian kernel in a crowd counting system, which includes the following steps.

1) Find a set of overlapping Gaussian kernels from training data:

Center point coordinates of every Gaussian kernels (i.e., a coordinate of the center point of a person's head) in training data generated through the Gaussian kernels of a traditional crowd counting system are read in a sequential order, a read Gaussian kernel being recorded as a Gaussian kernel that has been selected. Then, a center point coordinate of another Gaussian kernel that is mostly close to the selected one is found out.

For the above two Gaussian kernels a and b, center point coordinates of them each are $(x_{0\_a}, y_{0\_a})$ and $(x_{0\_b}, y_{0\_b})$, and variances of their respective Gaussian kernel density functions are $\sigma_a$ and $\sigma_b$ (here, a single variance value is used for each Gaussian kernel, because a Gaussian kernel in original training data is a circular shape in a two-dimensional coordinate system). If a geometric distance between their center point coordinates is less than a sum of the variances, then it is considered that these two Gaussian kernels in the training data have an overlap occurred between their corresponding heads in an original picture, that is, these two Gaussian kernels overlap one another.

$$\sqrt{(x_{0\_b}-x_{0\_a})^2+(y_{0\_b}-y_{0\_a})^2}<\sigma_a+\sigma_b \qquad (4)$$

For each Gaussian kernel, only another Gaussian kernel that has the shortest geometric distance from the one's own center point coordinate can be involved into a judgment as to whether there is an overlap therebetween. If it is judged that they have positively overlapped one another, they two may be regarded as Gaussian kernels that have been selected, and then proceed to step 2); otherwise, proceed to step 5).

2) Stretch an occluded Gaussian kernel:

For the Gaussian kernels a and b that are judged to be overlapping one another, if the variance of one of the Gaussian kernels a is greater than the variance of the other Gaussian kernel b, that is, $\sigma_a > \sigma_b$, then it is considered that a head corresponding to a has a shorter straight distance from a camera taking a crowd picture, and it is the a who occludes the b in the picture.

In this case, it is necessary to stretch the Gaussian kernel b along directions of the coordinate axes. The variance of the Gaussian kernel b is decomposed into two independent variance components $\sigma_{b\_x}$ and $\sigma_{b\_y}$ along the x-axis and the y-axis, respectively, and a direction of the x-axis is taken as a direction of a line connecting the center point coordinates of the Gaussian kernels a and b by default. Using the following formulas, the variance component of the occluded Gaussian kernel b along the x-axis is to be decreased, and the variance component of the Gaussian kernel b along the y-axis is kept unchanged, thereby two stretched independent variances $\sigma_{b\_x}^*$ and $\sigma_{b\_y}^*$ of the Gaussian kernel b along the x-axis and the y-axis are obtained respectively:

$$\sigma_{b\_x}^* = \sigma_{b\_x} \cdot \left( \frac{1}{2} + \frac{\sqrt{(x_{0\_b} - x_{0\_a})^2 + (y_{0\_b} - y_{0\_a})^2}}{2(\sigma_a + \sigma_b)} \right) \quad (5)$$

$$\sigma_{b\_y}^* = \sigma_{b\_y} \quad (6)$$

The variances of the stretched Gaussian kernel b are substituted into an expression of discrete Gaussian kernel of the traditional crowd counting system (Equation 3), and thereby an expression of stretched discrete Gaussian kernel can be obtained.

Figure 2:
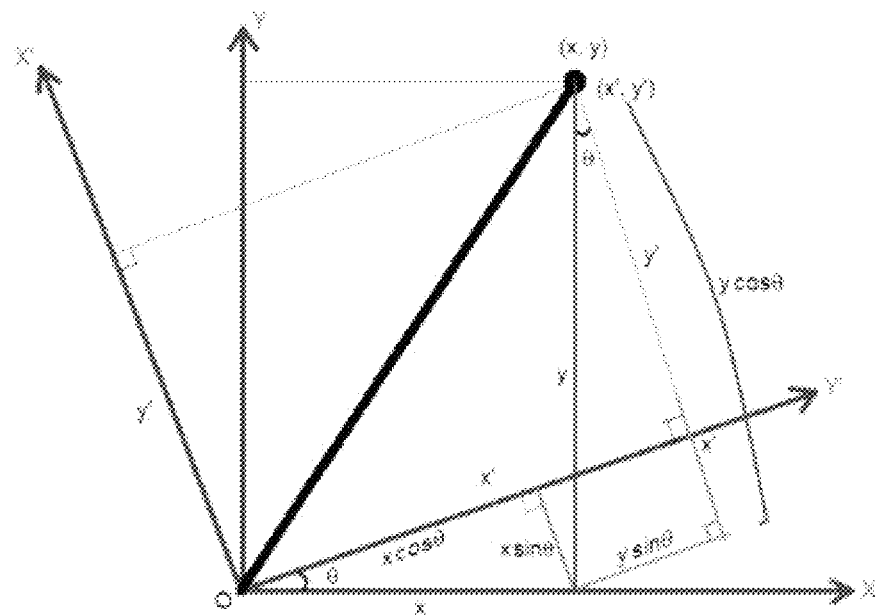
FIG. 2 is a schematic diagram showing a rotation principle of a plane coordinate system.

3) Rotate the occluded Gaussian kernel:

In practice, the direction of the line connecting the center points of the Gaussian kernels a and b may be any direction in the two-dimensional coordinate system of a crowd density map, and it may not necessarily be in a direction of the b's x-axis. It is assumed that there is an counterclockwise angle difference θ between the positive x-axis of the crowd density map and one end of the line connecting the center points of the Gaussian kernels a and b which faces toward the b, then the Gaussian kernel b is required to rotate counterclockwise by an angle θ with its own center point as the origin (as shown in the FIG. 2).

Then, a coordinate (x, y) of a point belonging to the crowd density map is transformed according to a coordinate transformation rule that the plane rectangular coordinate system is rotated counterclockwise by the angle θ so that a coordinate (x*, y*) of the point relative to a rotation-past coordinate system of the occluded Gaussian kernel b is obtained. The coordinate of this point relative to the rotation-past coordinate system of the occluded Gaussian kernel b is substituted into the expression of stretched discrete Gaussian kernel, and obtained is an expression of rotation-past stretched discrete Gaussian kernel.

$$x^* = x\cos\theta + y\sin\theta \quad (7)$$
$$= x \frac{x_{0\_b} - x_{0\_a}}{\sqrt{(x_{0\_b} - x_{0\_a})^2 + (y_{0\_b} - y_{0\_a})^2}} +$$
$$y \frac{y_{0\_b} - y_{0\_a}}{\sqrt{(x_{0\_b} - x_{0\_a})^2 + (y_{0\_b} - y_{0\_a})^2}}$$

$$y^* = y\cos\theta - x\sin\theta \quad (8)$$
$$= y \frac{x_{0\_b} - x_{0\_a}}{\sqrt{(x_{0\_b} - x_{0\_a})^2 + (y_{0\_b} - y_{0\_a})^2}} -$$
$$x \frac{y_{0\_b} - y_{0\_a}}{\sqrt{(x_{0\_b} - x_{0\_a})^2 + (y_{0\_b} - y_{0\_a})^2}}$$

4) Adjust the center point coordinate of the occluded Gaussian kernel:

Since the Gaussian kernel b is occluded by a, a visual effect of the corresponding head of the b in the original picture is resulted as that a geometric center of gravity of a unoccluded part (i.e., a visible part) of the b has actually be changed, that is, moved toward an orientation of the head corresponding to the Gaussian kernel b along a line connecting center points of the heads. In order to ensure that visual features of the crowd density map are close to that of the original picture, the center point coordinate of the Gaussian kernel b is moved, along the line connecting the center points of the Gaussian kernels a and b, toward an orientation of the Gaussian kernel b. A moving distance is equal to an amount $\sigma_{b\_x} - \sigma_{b\_x}^*$ by which the variance of the Gaussian kernel b decreases along the x-axis in the step 2). An adjustment of the center point coordinates of the occluded Gaussian kernel b is completed through these above operations. An adjusted center point coordinate $(x_{0\_b}^*, y_{0\_b}^*)$ of the Gaussian kernel b is as follows:

$$x_{0\_b}^* = x_{0\_b} + (\sigma_{b\_x} - \sigma_{b\_x}^*)\cos\theta \quad (9)$$
$$= x_{0\_b} + (\sigma_{b\_x} - \sigma_{b\_x}^*) \frac{x_{0\_b} - x_{0\_a}}{\sqrt{(x_{0\_b} - x_{0\_a})^2 + (y_{0\_b} - y_{0\_a})^2}}$$

$$y_{0\_b}^* = y_{0\_b} + (\sigma_{b\_x} - \sigma_{b\_x}^*)\sin\theta \quad (10)$$
$$= y_{0\_b} + (\sigma_{b\_x} - \sigma_{b\_x}^*) \frac{y_{0\_b} - y_{0\_a}}{\sqrt{(x_{0\_b} - x_{0\_a})^2 + (y_{0\_b} - y_{0\_a})^2}}$$

Figure 3:
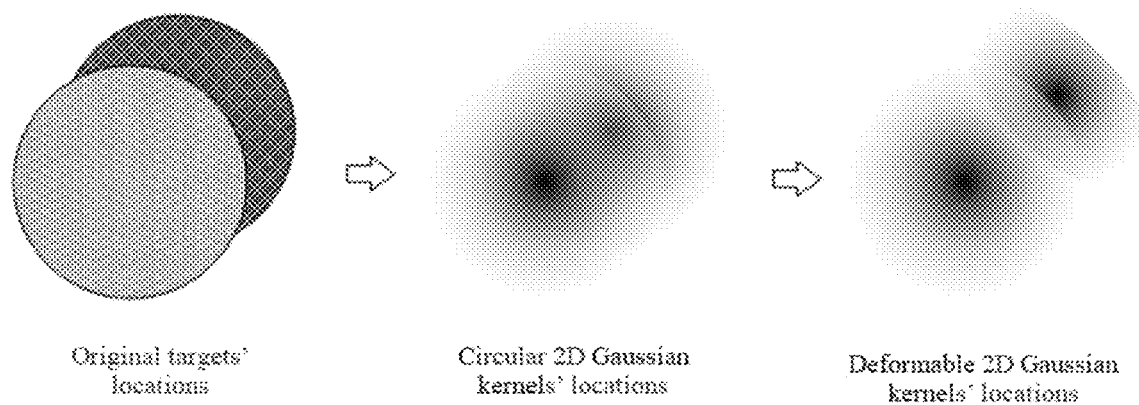
FIG. 3 is an effect diagram of a deformable Gaussian kernel.

Then, the adjusted center point coordinate of the occluded Gaussian kernel b is substituted into the expression of rotation-past stretched discrete Gaussian kernel so that an expression of rotation-past stretched discrete Gaussian kernel with an adjusted center point coordinate is obtained. An effect of such a deformable Gaussian kernel is shown in FIG. 3.

5) Determine whether there is a Gaussian kernel that has not been selected in the training data:

If there is any Gaussian kernel that has not been selected yet in the step 1) in the training data, then go back to the step 1); otherwise, with respect to respective pixels in the crowd density map, gray values of those pixels belonging to a Gaussian kernel are added together, and a resulted crowd density map having the gray values is output as training data. Then, the process ends.

In summary, the present disclosure adopts a deformable Gaussian kernel to replace a fixed circular Gaussian kernel in a traditional method. When it is determined that there is mutual occlusion between those traditional circles, it is considered that human heads corresponding to those Gaussian kernels are occluding one another. For a Gaussian kernel that is occluded, the present disclosure is provided to adjust, by successively using deformation approaches such as stretch, rotation, and center point coordinate adjustment, a visual center of gravity of a deformed Gaussian kernel in a crowd density map to be generally consistent with a visual center of gravity of an exposed part of the occluded head in an original picture, and further increase a separation extent between the visual centers of gravity of the Gaussian kernels that are occluding one another so that a convolutional neural network is facilitated to learn features of the occluded head. Since integrity of the occluded Gaussian kernel is not broken, the present disclosure ensures that an integral of each Gaussian kernel in the training data is still of 1, which still meets a requirement of crowd counting. Using improvement provided by the present disclosure, consistency of feature patterns between the training data's purposed crowd density map and the actual picture can be ensured, a training effect of the convolutional neural network is enhanced, and an accuracy of the crowd counting system is improved eventually.

The foregoing embodiments are only used to illustrate the present disclosure, and change may be performed to respective steps thereof. On the basis of the technical solution of the present disclosure, any modification and equivalent transformation performed to an individual step according to the principles of the present disclosure should not be excluded outside the protection scope of the present disclosure.

The invention claimed is:

1. A method for generating training data based on a deformable Gaussian kernel in a crowd counting system, wherein the method comprises steps of:
   1) finding a set of overlapping Gaussian kernels from training data, wherein each of the Gaussian kernels has a human head-like shape, and represents a two-dimensional coordinate of a human head in a crowd density map with using a coordinate of position of the head as a center point;
   2) stretching an occluded Gaussian kernel;
   3) rotating the occluded Gaussian kernel;
   4) adjusting a center point coordinate of the occluded Gaussian kernel; and
   5) determining whether there is any Gaussian kernel that has not been selected in the training data, and outputting a resulted crowd density map having gray values to a convolutional neural network as training data for learning features of occluded heads by the convolutional neural network.

2. A method according to claim 1, wherein in the step 1), reading, in a sequential order, center point coordinates of every Gaussian kernels in the training data generated through Gaussian kernels of a traditional crowd counting system, recording a read Gaussian kernel as a Gaussian kernel that has been selected, and finding a center point coordinate of another Gaussian kernel that is mostly close to the Gaussian kernel that has been selected; if a geometric distance between the center point coordinates of the Gaussian kernel that has been selected and the another Gaussian kernel is less than a sum of their respective variances, then considering that that the two Gaussian kernels in the training data have an overlap occurred between their corresponding heads in an original picture, that is, the two Gaussian kernels overlap one another.

3. A method according to claim 2, wherein for each Gaussian kernel, only another Gaussian kernel that has the shortest geometric distance from the Gaussian kernel's own center point coordinate is involved into a judgment as to whether there is an overlap therebetween, if it is judged that they have positively overlapped one another, regarding they two as Gaussian kernels that have been selected, and then proceeding to the step 2); otherwise, proceeding to the step 5).

4. A method according to claim 1, wherein in the step 2), for Gaussian kernels a and b that are judged to be overlapping one another, if a variance of one of the Gaussian kernels a is greater than a variance of another Gaussian kernel b, then considering that a head corresponding to the a has a shorter straight distance from a camera taking a crowd picture, and the a occludes the b in the picture.

5. A method according to claim 4, wherein stretching the Gaussian kernel b along directions of coordinate axes:
   decomposing the variance of the Gaussian kernel b into two independent variance components $\sigma_{b\_x}$ and $\sigma_{b\_y}$ along a x-axis and a y-axis, respectively, and taking a direction of the x-axis as a direction of a line connecting center point coordinates of the Gaussian kernels a and b by default; according to following formulas, decreasing the variance component of the occluded Gaussian kernel b along the x-axis, and keeping the variance component of the Gaussian kernel b along the y-axis unchanged:

$$\sigma_{b\_x}^* = \sigma_{b\_x} \cdot \left( \frac{1}{2} + \frac{\sqrt{(x_{0\_b} - x_{0\_a})^2 + (y_{0\_b} - y_{0\_a})^2}}{2(\sigma_a + \sigma_b)} \right) \quad (5)$$

$$\sigma_{b\_y}^* = \sigma_{b\_y}; \quad (6)$$

and
   substituting variances of a stretched Gaussian kernel b into an expression of discrete Gaussian kernel of a traditional crowd counting system to obtain an expression of stretched discrete Gaussian kernel.

6. A method according to claim 1, wherein in the step 3), assuming that there is an counterclockwise angle difference θ between a positive part of the x-axis of the crowd density map and one end of a line connecting center points of Gaussian kernels a and b which faces toward the Gaussian kernel b, then rotating counterclockwise the Gaussian kernel b by an angle θ with the b's own center point as an origin; transforming, according to a coordinate transformation rule that a plane rectangular coordinate system is rotated counterclockwise by the angle θ, a coordinate (x, y) of a point belonging to the crowd density map to obtain a coordinate (x*, y*) of the point relative to a rotation-past coordinate system of the occluded Gaussian kernel b; and substituting the coordinate of said point relative to the rotation-past coordinate system of the occluded Gaussian kernel b into an expression of stretched discrete Gaussian kernel to obtained an expression of rotation-past stretched discrete Gaussian kernel.

7. A method according to claim 6, wherein the coordinate (x*, y*) is that, $$x^* = x\cos\theta + y\sin\theta \quad (7)$$

$$= x \frac{x_{0\_b} - x_{0\_a}}{\sqrt{(x_{0\_b} - x_{0\_a})^2 + (y_{0\_b} - y_{0\_a})^2}} +$$

$$y \frac{y_{0\_b} - y_{0\_a}}{\sqrt{(x_{0\_b} - x_{0\_a})^2 + (y_{0\_b} - y_{0\_a})^2}}$$

$$y^* = y\cos\theta - x\sin\theta \quad (8)$$

$$= y \frac{x_{0\_b} - x_{0\_a}}{\sqrt{(x_{0\_b} - x_{0\_a})^2 + (y_{0\_b} - y_{0\_a})^2}} -$$

$$x \frac{y_{0\_b} - y_{0\_a}}{\sqrt{(x_{0\_b} - x_{0\_a})^2 + (y_{0\_b} - y_{0\_a})^2}}.$$

8. A method according to claim 1, wherein in the step 4), moving, along a line connecting center points of Gaussian kernels a and b, the center point coordinate of the Gaussian kernel b toward an orientation of the Gaussian kernel b, a moving distance being equal to an amount $\sigma_{b\_x}-\sigma_{b\_x}^*$ by which a variance of the Gaussian kernel b decreases along a x-axis in the step 2).

9. A method according to claim 8, wherein an adjusted center point coordinate $(x_{0\_b}^*, y_{0\_b}^*)$ of the Gaussian kernel b is that, $$x_{0\_b}^* = x_{0\_b} + (\sigma_{b\_x} - \sigma_{b\_x}^*)\cos\theta \qquad (9)$$
$$= x_{0\_b} + (\sigma_{b\_x} - \sigma_{b\_x}^*)\frac{x_{0\_b} - x_{0\_a}}{\sqrt{(x_{0\_b} - x_{0\_a})^2 + (y_{0\_b} - y_{0\_a})^2}}$$

$$y_{0\_b}^* = y_{0\_b} + (\sigma_{b\_x} - \sigma_{b\_x}^*)\sin\theta \qquad (10)$$
$$= y_{0\_b} + (\sigma_{b\_x} - \sigma_{b\_x}^*)\frac{y_{0\_b} - y_{0\_a}}{\sqrt{(x_{0\_b} - x_{0\_a})^2 + (y_{0\_b} - y_{0\_a})^2}}.$$

10. A method according to claim 1, wherein in the step 5), if there is any Gaussian kernel that has not been selected in the step 1) in the training data, then going back to the step 1); otherwise, with respect to respective pixels in the crowd density map, adding gray values of pixels belonging to a Gaussian kernel together, and outputting a resulted crowd density map having the gray values as training data, then ending.

* * * * *